W. S. MORSE AND C. T. EVANS.
CIRCUIT CONTROLLER.
APPLICATION FILED FEB. 18, 1916.

1,351,184.

Patented Aug. 31, 1920.
3 SHEETS—SHEET 1.

W. S. MORSE AND C. T. EVANS.
CIRCUIT CONTROLLER.
APPLICATION FILED FEB. 18, 1916.

1,351,184.

Patented Aug. 31, 1920.
3 SHEETS—SHEET 2.

Inventors
Willis S. Morse
Clarence T. Evans
By Frank H. Hubbard
Attorney

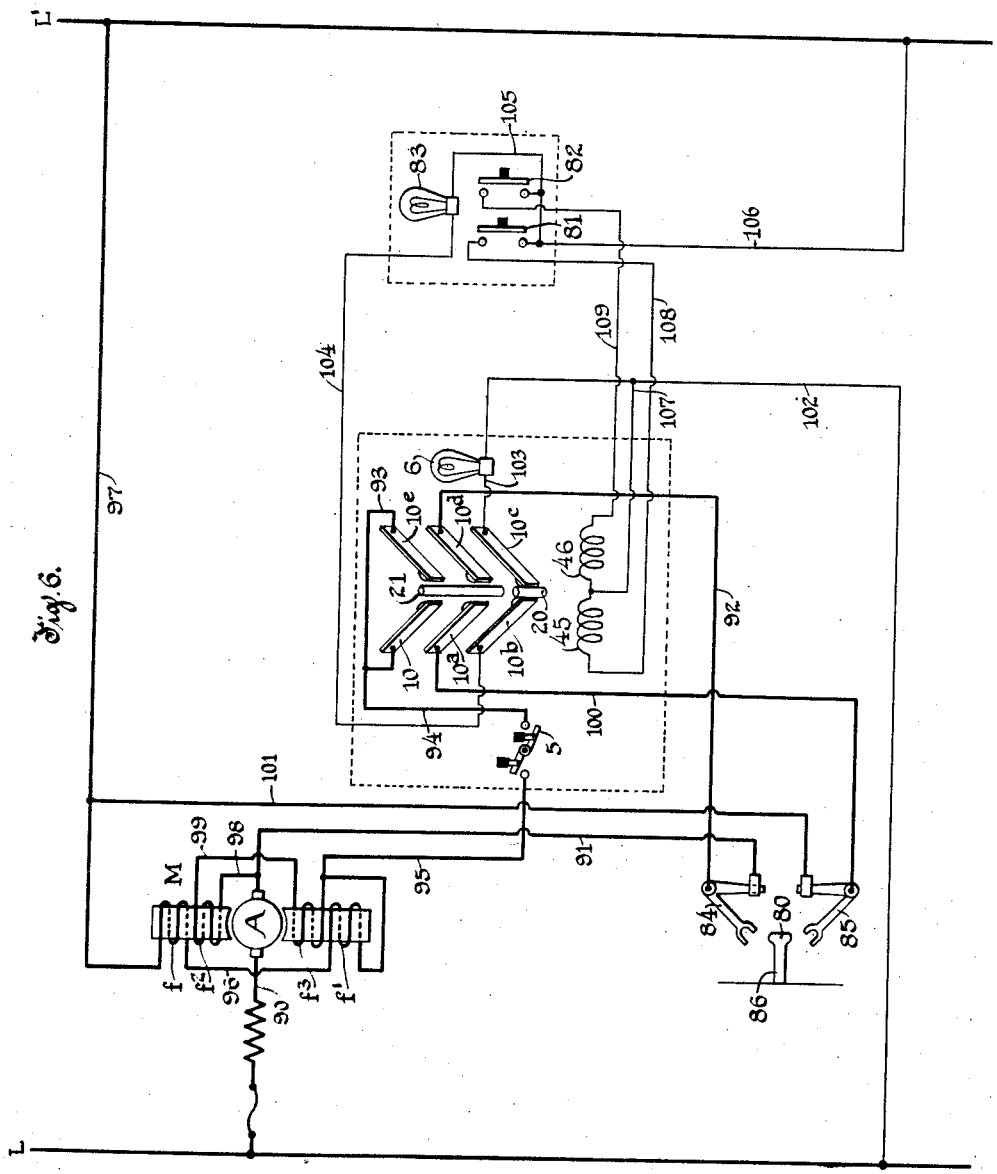

UNITED STATES PATENT OFFICE.

WILLIS S. MORSE, OF NEW YORK, N. Y., AND CLARENCE T. EVANS, OF MILWAUKEE, WISCONSIN.

CIRCUIT-CONTROLLER.

1,351,184.  Specification of Letters Patent.  Patented Aug. 31, 1920.

Application filed February 18, 1916. Serial No. 79,101.

*To all whom it may concern:*

Be it known that we, WILLIS S. MORSE and CLARENCE T. EVANS, both citizens of the United States, and residing, respectively, at New York, in the county of New York and State of New York, and Milwaukee, in the county of Milwaukee and State of Wisconsin, have invented new and useful Improvements in Circuit-Controllers, of which the following is a full, clear, concise, and exact description, reference being had to the accompanying drawing, forming a part of this specification.

This invention relates to improvements in circuit controllers.

Controllers embodying the invention are particularly useful in systems of tension regulation for printing presses, such as that disclosed in the patent to W. S. Morse, No. 1,103,153 of July 14, 1914, although as will be apparent, various features of the invention may be advantageously employed in other relations.

The aforesaid system includes a reversible motor to adjust a brake on the web roll in accordance with the adjustments of a roller bearing upon the moving web, and this invention has among its objects to provide an improved rugged and durable control mechanism operable by said roller to govern said motor and also for use in other relations.

A further object is to provide a controller for the aforesaid and other purposes with improved means for effecting adjustment thereof at will from any desired point or points about the press or other mechanism.

A further object is to provide a controller including means for the aforesaid and other purposes which will be exceedingly compact and at the same time readily accessible as to all parts thereof.

Various other objects and advantages of the invention will hereinafter appear.

The accompanying drawings illustrate one embodiment of the invention which has been worked out in practice and the same will now be described, it being understood that the invention is susceptible of embodiment in other forms falling within the scope of the appended claims.

In the drawings,

Fig. 6 is a diagrammatic view illustrating the use of the controller in a tension regulating system of the character mentioned.

Figure 1:
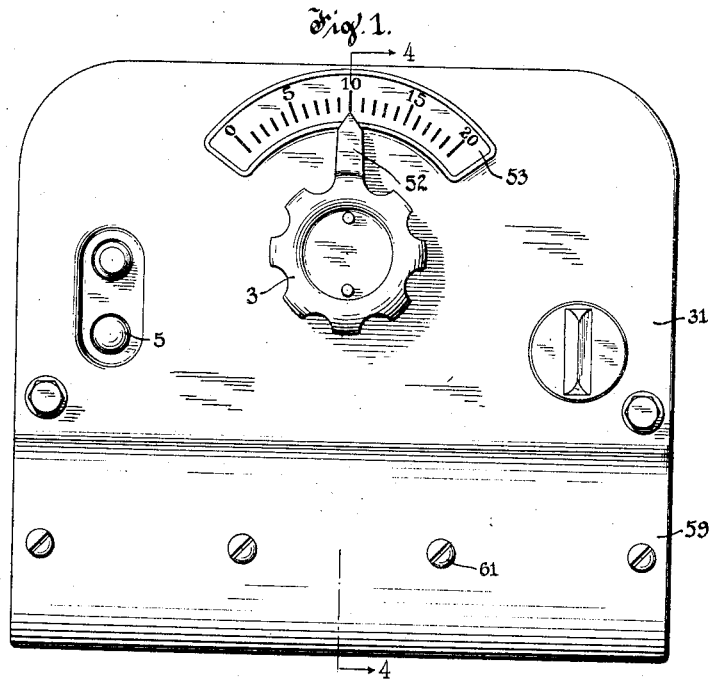
Figure 1 is a front elevation of the controller.
Figure 2:
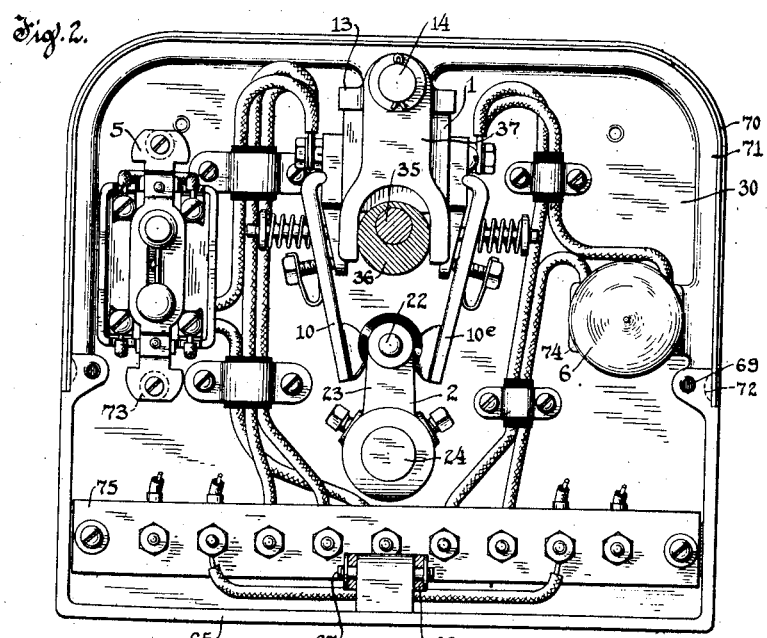
Fig. 2 is a view similar to Fig. 1 but with the front of the casing removed to disclose the inclosed mechanism.

Referring to Fig. 2, the controller includes a relatively stationary but pivotally adjustable contact member 1, a coöperating pivoted contact member 2, adjusting means for the member 1 including a rotatable handle 3 (Fig. 1) and a solenoid ratcheting mechanism 4 (Fig. 5), a snap switch 5 of the flush type to control the circuit to member 1, and an indicating lamp 6 for a purpose hereinafter set forth. In the use of the controller for tension regulation the coöperating contact members 1 and 2 control the brake adjusting motor, starting and stopping said motor upon adjustments of the member 2 which is operatively connected with the roller bearing upon the moving web. Said members also serve to effect reverse operations of the motor in accordance with the direction of movement of the member 2 from neutral position. Still further, the members 1 and 2 control the indicating lamp 6 in a manner to light the same when said members are in neutral position to render the motor inert and to extinguish said lamp while the motor is in operation in either direction. As will be understood, the adjustment of the relatively stationary contact member 1 varies the adjustment of the system as a whole and hence the purpose of the aforesaid adjusting means 3 and 4 will be apparent.

Figure 3:
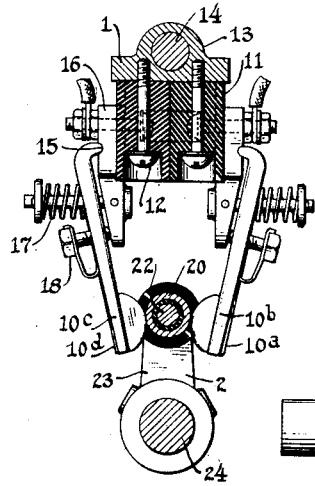
Fig. 3 is a detail view of a switch mechanism of the controller.
Figure 4:
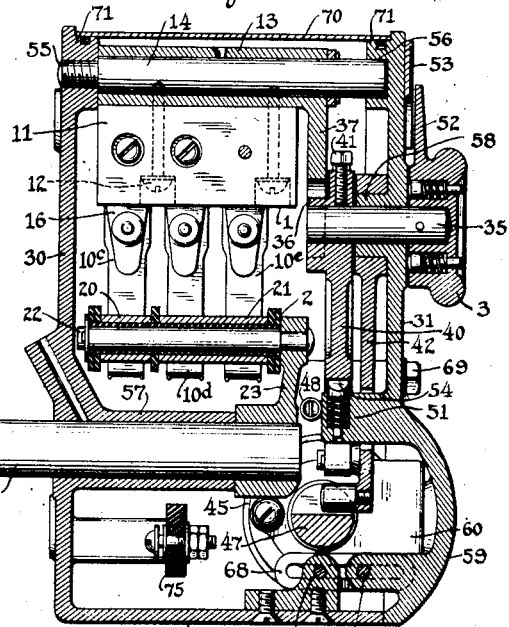
Fig. 4 is a sectional view on line 4—4, Fig. 1.

Referring more specifically to the switch comprising contact members 1 and 2, the same is best illustrated in Figs. 3 and 4. The member 1 includes a plurality of opposed contact fingers 10 of conventional form mounted on opposite sides of an insulating block 11, secured as by screws 12, to a bracket 13 loosely mounted upon a spindle 14. The several contact fingers are all of like construction, each comprising a rigid arm having a trunnion bearing 15 in a supporting bracket 16, a coiled spring tension device 17 and an adjustable stop screw 18. Thus if the support be maintained stationary the opposed fingers will yield in opposite directions against their respective tension devices. In this particular instance the member 1 is provided with six contact fingers 10, 10$^a$, 10$^b$, 10$^c$, 10$^d$ and 10$^e$ divided into two opposing sets of three each and, as will hereinafter appear, again electrically divided into other groups. The member 2, on the other hand, is provided with two cylindrical contacts 20 and 21 mounted in axial alinement and disposed between the tips of the opposed contact fingers of the member 1. The contacts 20 and 21 are mounted upon a spindle 22 fixed at its forward end to a bracket 23 in turn fixed to a revoluble spindle 24. The contact 20 coöperates with two opposed contact fingers while the contact 21 coöperates with the remaining four contact fingers and said contacts 20 and 21 are insulated from one another and from the spindle 22. The shaft 24 provides for operative connection of the member 2 with the aforesaid web engaging roll for effecting movement of the member 2 in reverse directions to coöperate with the two sets of opposed contact fingers selectively in accordance with the direction of its movement. In this connection it will be noted that the contact fingers 10 will yield to permit considerable adjustment of the member 2 and that in consequence the relative movements of the member 2 and the adjustable operating roller may be readily proportioned to confine the maximum movement of the former within the range permitted by said contact fingers. Also, it will be noted that the arrangement of contacts is such as to provide for abutting engagement thereof and that the resiliency of the contact fingers insures firm engagement of said contacts on a slight relative movement thereof. The durability and efficiency of the switch will accordingly be at once apparent.

Figure 5:
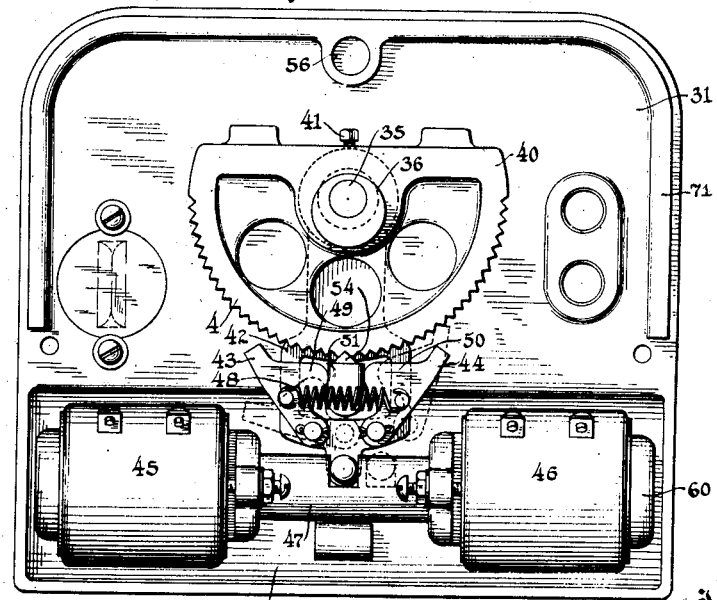
Fig. 5 is a rear view of the front wall of the box and the mechanism mounted thereon.

The switch movement just described is mounted upon the rear wall 30 of the inclosing casing while the adjusting mechanism for the member 1 is mounted upon the opposite or front wall 31 of said casing. The adjusting mechanism, as best illustrated in Figs. 2, 4 and 5 includes a spindle 35 connected with the handle 3 and carrying an eccentric 36 engaging a forked lever 37 fixed to the member 1, said lever, as shown, being integral with the bracket 13. The eccentric thus provides for pivotal adjustment of the member 1 in either direction by corresponding rotation of the spindle 35 and also serves when at rest to positively lock the member 1 in adjusted position. The eccentric, as before stated, is directly operable by the handle 3 and as will now be explained, it is also operable by the solenoid ratcheting mechanism 4, best illustrated in Fig. 5. This mechanism includes a ratchet segment 40 mounted upon and fixed to the spindle 35 by a set screw 41, a depending lever 42 fulcrumed concentrically with said spindle, opposed pawls 43 and 44 pivoted on said depending lever to engage said ratchet segment and two oppositely acting solenoids 45 and 46 having a common core 47 operatively connected to the lever 42. The pawls 43 and 44 are connected by a spring 48 and have lugs 49 and 50 respectively bearing on opposite sides of a fixed stop 51 comprising a lug on the casing projecting through a recess in the lever 42. The projections on the pawl which engage the stop 51 are rounded whereby if it be assumed that the lever 42 is moved to the right the pawl 44 will be thrown into engagement with the ratchet segment, as shown in dotted lines, Fig. 5, to impart one step of movement thereto. Under these conditions the pawls are thrown out of normal relation and in consequence upon release of the lever 42 the tension of the spring would tend to restore the pawls to their normal relation and in consequence would return the lever to its centered position. Then should the lever be moved to the left the pawl 43 would be thrown into engagement with the ratchet segment for one step of movement of the latter in a reverse direction and the lever would be returned to centered position upon release thereof. As before stated, movement of the ratchet segment rotates the eccentric 36 thereby adjusting the switch member 1 in one direction or the other in accordance with the direction of movement of the lever 42. As will be understood, full response of either solenoid effects but a single step of the ratchet segment and the arm 42 is free for return movement upon deënergization of the solenoid employed. During the adjustment of the contact member by the ratcheting mechanism described the handle 3 is also operated and in turn operates a pointer 52 coöperating with a dial 53 graduated to correspond with the steps of movement of the ratchet segment. This provides for visual indication of the position of member 1 and a step by step indication of its adjustment. A spring pressed plunger 54 mounted in the fixed lug 51 coöperates with the ratchet segment to releasably lock the same in its different positions.

Referring now to the construction of the inclosing casing, the same is provided in its rear wall 30 with a threaded socket 55 for one end of the spindle 14 supporting the contact member 1 and in its front wall 31 with a socket 56 to freely receive the opposite end of said spindle. Also, the rear wall 30 of the casing is provided with a projecting bearing 57 for the spindle 24 carrying the contact member 2, said bearing being of sufficient length to avoid the necessity of supporting the shaft 24 in the front wall of the box. As before stated, the adjusting mechanism for the contact member 1 is mounted on the front wall of the casing and to this end said wall is provided with a bearing 58 for the spindle 35 and lever 42 and with a curved offset portion 59 to receive the solenoids 45 and 46, each of said solenoids being mounted in a frame 60 secured to the casing wall by screws 61. Thus, it will be observed that the inclosed mechanism so far described is divided into two units, one unit secured to the rear wall 30 and the other to the front wall 31 of the casing. In consequence, so far as such mechanism is concerned the front wall of the box may be removed without in any wise disturbing the mechanism secured to the rear wall, thereby enabling ready assembly of the mechanism in the compact form illustrated and rendering all parts of the mechanism thereafter accessible. However, as the casing is constructed, such full removal of the front wall is unnecessary. The casing is provided with a bottom wall 65 preferably integral with the rear wall 30 and the front wall 31 is hinged to said bottom wall. While of course, the parts might be hinged in any desired manner, it is preferred to provide said parts with pins 66 and 67 respectively and connecting links 68 whereby the front wall may be dropped to a horizontal position and firmly supported in such position. Also, any desired means might be provided for locking the front wall in vertical position, but for a convenient and secure fastening it is preferred to provide bolts 69 threading into bosses provided on the side walls of the box. In practice, it would probably be desirable at times to inspect the mechanism without necessitating access to all parts thereof and to this end the inclosing box is preferably provided with a U-shaped sheet metal cover 70 constituting the top and upper side walls thereof, the lower side walls being preferably integral with the back and bottom walls. With this arrangement the front and rear walls are preferably provided with flanges 71 as illustrated in Fig. 4 to support the removable cover and said cover is preferably unsecured except by projections 72 shown in dotted lines, Fig. 2, to snap into recesses in the lower side walls. Thus the cover may be readily removed and when removed will render practically the entire mechanism free for inspection and many of the parts also accessible.

As will be observed from Fig. 2 the switch mechanism comprising contact members 1 and 2 is centrally disposed within the casing with the switch 5 on one side thereof and the lamp 6 on the opposite side, the switch being supported by studs 73 projecting from the rear wall of the box and the lamp having a socket 74 secured directly to the rear wall. Also, as shown in Figs. 2 and 4, the box has mounted therein below the aforesaid mechanism a transversely extending insulating strip 75 carrying terminals for the leads to and from the inclosed electrical parts and for the external leads which may be passed through the box at any desired point or points.

Referring now to Fig. 6 the same diagrammatically illustrates the controller as governing a motor M and further shows in conjunction with said controller a limit switch 80, a control station for the solenoids 45 and 46 including push button switches 81 and 82 and an indicating lamp 83 functioning in the same manner as the lamp 6 above described.

The motor M is of conventional form being provided with an armature A and two sets of opposed series field windings $f$—$f'$ and $f^2$—$f^3$. When all of the field windings are energized the motor is rendered inert whereas the motor is set in operation by exclusion of one set and in opposite directions in accordance with the active set of windings. The contacts 21, 10, $10^c$, $10^d$ and $10^e$ of the controller coöperate to selectively short-circuit the sets of field windings in accordance with the direction of movement of the contact 21. As shown, the contacts mentioned are in normal or neutral position, whereas contact 21 is movable in opposite directions to selectively bridge the contact fingers in pairs. The limit switch 80 includes two normally closed single pole switches 84 and 85 adapted to be operated by a member 86 operatively connected with the motor M or some part driven thereby.

Thus assuming that the tension on the web varies to cause the contact 21 to move to the right the motor circuit may be traced from line L by conductor 90 through the motor armature by conductor 91 through limit switch 84, by conductor 92 through contacts $10^d$ and $10^e$, by conductors 93 and 94 through the snap switch 5, by conductor 95 through field winding $f'$, by conductor 96 through field winding $f$ to conductor 97 and thence to the line L'. Thus the field windings $f^2$ and $f^3$ are short-circuited and the motor is set in operation in the proper direction to rectify the tension variation. If the variation is rectifiable within the limits of operation of the motor then contact 21 will be restored to neutral position to stop the motor. On the other hand, if the motor fails to rectify the tension variation within the limit established by switch 84 then said switch will be opened to interrupt the short-circuit around the field windings $f^2$ and $f^3$ to arrest the operation of the motor. On the other hand, if the tension variation is such as to move the contact to the left, then the motor circuit may be traced through the motor armature as described, by conductor 98 through field winding $f^2$, by conductor 99 through field winding $f^3$, by conductor 95 through snap switch 5, by conductor 94 through contacts 10, 21 and $10^a$, by conductor 100 through limit switch 85, by conductors 101 and 97 to line L'. Under such conditions, the field windings $f$ and $f'$ are short-circuited whereby the motor is started in an opposite direction to that previously described. Then if the operation of the motor rectifies the tension variation the motor will be arrested by disengagement of contact 21 from contacts 10 and $10^a$ whereas if the motor fails to so function its operation will be arrested by opening of the limit switch 85.

The lamps 6 and 83 of the controller and control station respectively are governed by contact 20 and its coöperating contact fingers $10^b$ and $10^c$. The arrangement is such that in the neutral position of the controller both fingers $10^b$ and $10^c$ engage said contact whereby a circuit may be traced from line L by conductor 102 through lamp 6, by conductor 103 through said contacts, by conductor 104 through lamp 83, by conductors 105 and 106 to line L'. Thus, as before set forth, the lamps are lighted in neutral position whereas when the controller is moved in either direction contact 20 will disengage one of the two coöperating fingers thereby breaking the circuit just described and extinguishing the lamps until return to neutral position.

Adjustment of the member 1 of the controller may be effected either by adjustment of the handle 3 or by operation of the control switches 81 and 82 to energize the ratcheting mechanism above described. If, for example, it is desired to adjust the controller by the solenoid 45, then the push button 81 is depressed to complete circuit from line L by conductors 102 and 107 through the winding of said solenoid, by conductor 108 through switch 81 to conductor 106 and thence to line L'. On the other hand, if it is desired to adjust the controller by energization of the solenoid 46 the push button 82 is depressed to complete circuit from line L, by conductors 102 and 107 through the said solenoid, by conductor 109 through switch 82 to conductor 106 and thence to line L'. As will be understood, energization of either solenoid merely effects one step of adjustment of the controller and for further adjustment the operation of the selected push button must be repeated. Also it will be understood that the adjustment of the controller is at once indicated by the pointer and dial and by the extinguishing of lamps 6 and 83 so that attendants at both the controller and the control station will be apprised of adjustments made by either. Further, as the lamps will remain extinguished until the system responds to restore the controller to neutral position, said lamps will serve to apprise the one directing an adjustment of the execution thereof. The controller and control station may, of course, be arranged at any desired point about the press. For example, the controller might be located adjacent to the web roll while the control station might be located at the delivery end of the press.

What we claim as new and desire to secure by Letters Patent is:

1. The combination with an oscillatable switch arm, and opposed contacts yieldingly mounted thereon, of an electromagnetic ratcheting mechanism to effect adjustment of said arm in steps and a contact member located between said opposed contacts and movable bodily in opposite directions for engaging said contacts selectively.

2. The combination with an oscillatable switch arm, of opposed contacts carried thereby for movement therewith, said arm having an operating lever extending therefrom substantially at right angles to its axis, electromagnetic operating means for said lever, a shaft journaled between said operating means and said switch arm and a contact member carried by said shaft for coöperation with said opposed contacts.

3. The combination with an oscillatable switch arm and opposed contacts carried thereby for movement therewith, of a contact member located between said contacts and movable bodily for selective coöperation therewith, said switch arm having an operating lever extending toward said contact member, a pivoted sector extending beyond said contact member and having a cam engaging said operating member, and selectively operable manual and electro-responsive actuating means for said sector.

4. The combination with an oscillatable switch arm and a plurality of sets of opposed contacts mounted thereon for movement therewith, of a contact member located between said opposed contacts and movable bodily in a single direction for interrupting circuit between one set of opposed contacts while engaging another of said contacts.

5. The combination with an oscillatable switch arm and a plurality of sets of opposed contacts mounted for movement therewith, of a contact member located between said opposed contacts and movable bodily in either direction to engage certain of said contacts while insuring separation of other of said opposed contacts, and electro-responsive means operable to insure a step by step movement of said switch arm for varying the relation of said contacts to said contact member.

6. The combination with an oscillatable switch arm, of opposed contacts carried thereby for movement therewith, said arm having an operating lever extending therefrom substantially at right angles to its axis, a casing for inclosing all of said elements, auxiliary manual adjusting means for said switch arm and power operating means for said contact member, both of said latter means being operable from outside said casing.

7. In a circuit controller, in combination, a relatively stationary but laterally adjustable member, contact fingers yieldingly mounted thereon in opposed relation and biased toward each other, and a contact interposed between said fingers and movable in opposite directions to engage the same selectively, certain of said contact fingers being relatively adjustable to vary the extent of movement of said movable contact in either direction incident to such selective engagement.

8. In a circuit controller, in combination, a normally stationary member, a pair of contact fingers yieldingly mounted thereon in opposed relation and biased toward each other, a coöperating contact member bodily movable in either direction to engage said fingers selectively, means for effecting adjustment of said fingers jointly with respect to said movable contact member, and additional means for providing adjustment of said fingers relative to each other and to said movable contact member.

9. In a circuit controller, in combination, a relatively stationary member, opposed contact fingers mounted thereon and projecting therebeyond, said fingers being biased toward each other and having means to vary the distance therebetween, a movable contact interposed between said fingers to engage the same selectively and electromagnetically operated means for effecting adjustment of said first mentioned member to vary the position of said contact fingers with respect to said movable contact.

10. In a circuit controller, in combination, a relatively stationary member adjustable about a pivot, opposed contacts carried thereby, a movable contact disposed between said former contacts to make engagement therewith selectively, and alternative manual and electromagnetic adjusting means for said member.

11. The combination with an electric switch including a relatively stationary but adjustable contact member, of an electromagnetic ratcheting mechanism to effect adjustment of said member and a manually operable member for directly adjusting said switch member through the medium of a member included in said ratcheting mechanism.

12. The combination with an electric switch having a relatively stationary but adjustable contact and a coöperating contact member movable relatively thereto, of a ratchet segment operatively connected to said contact, a pivoted member provided with two pawls having a resilient connection and both bearing against a fixed stop to selectively engage and operate said ratchet segment in opposite directions upon movement of said pivoted member in opposite directions from a centered position and manual operating means for said adjustable contact.

13. The combination with an electric switch having a relatively stationary but pivotally adjustable contact member, an eccentric engaging said contact member, manual means for directly rotating said eccentric and electromagnetic ratcheting means to rotate said eccentric for adjustment of said contact member.

14. In combination, a relatively stationary but pivotally adjustable contact member provided with opposed yieldable contacts, an independently pivoted member having a contact interposed between said former contacts to coöperate therewith selectively, and an electromagnetic ratcheting mechanism for adjusting said first mentioned contact member, said ratcheting mechanism being arranged in a plane at right angles to the axes of said contact members and being bodily movable in the plane of said axes.

15. In combination, a relatively stationary but pivotally adjustable contact member provided with opposed yieldable contacts, an independently pivoted member having a contact interposed between said former contacts to coöperate therewith selectively, and an electromagnetic ratcheting mechanism for adjusting said first mentioned contact member, said ratcheting mechanism being arranged in a plane at right angles to the axes of said contact members and supporting means for said ratcheting mechanism providing for free bodily movement thereof away from said contact members to give access thereto.

16. The combination with an electric switch mechanism, of an electromagnetic ratcheting mechanism for adjusting a member of said switch mechanism, said mechanisms having readily separable interfitting parts for operatively connecting the same and supporting means for one of said mechanisms permitting its separation from the other mechanism to give access thereto.

17. In a circuit controller, in combination, a switch mechanism, an electromagnetic adjusting mechanism associated therewith, said mechanisms being readily separable and an inclosing casing for said mechanisms having a removable wall bodily supporting one of the same.

18. In a circuit controller, in combination, a switch mechanism, an electromagnetic adjusting mechanism associated therewith, said mechanisms being readily separable and an inclosing casing having a hinged wall bodily supporting one of said mechanisms.

19. In a circuit controller, in combination, an inclosing casing, a switch mechanism mounted upon one wall thereof, an electromagnetic ratcheting mechanism mounted upon the opposite wall of said casing, said mechanisms having readily separable interfitting parts to operatively connect the same and one of said walls of said casing being removable for separation of said mechanisms.

20. In a circuit controller, in combination, an inclosing casing, a switch mechanism mounted on one wall thereof, an electromagnetic ratcheting mechanism mounted on the opposite wall of said casing with its electromagnetic windings disposed on opposite sides of said switch mechanism, said mechanisms having readily separable interfitting parts to operatively connect the same and the wall of said casing carrying said ratcheting mechanism being hinged to permit withdrawal of said ratcheting mechanism from said switch mechanism.

21. In a circuit controller, the combination with an electric switch mechanism, of an electromagnetic ratcheting mechanism for adjusting one of the elements of said switch mechanism, an inclosing casing for said mechanisms, and means on the exterior of said casing and operatively connected to a member included in said ratcheting mechanism for indicating the position of said element, said means being manually operable to effect direct adjustment of said element.

22. In a circuit controller, the combination with an electric switch mechanism, of an electromagnetic ratcheting mechanism for adjusting one of the elements of said switch mechanism, said mechanisms being readily separable, an inclosing casing for said mechanisms having a removable wall for supporting said ratcheting mechanism and means on the exterior of said wall and operatively connected to a member included in said ratcheting mechanism for indicating the position of said element, said means being manually operable to effect direct adjustment of said element.

In witness whereof, we have each hereunto subscribed our names.

WILLIS S. MORSE.
CLARENCE T. EVANS.